United States Patent [19]

Murphy et al.

[11] 4,150,090

[45] Apr. 17, 1979

[54] APPARATUS FOR REGENERATION OF CRACKING CATALYST

[75] Inventors: James R. Murphy; Alvaro A. Murcia, both of Houston, Tex.

[73] Assignee: Pullman Incorporated, Chicago, Ill.

[21] Appl. No.: 817,470

[22] Filed: Jul. 20, 1977

Related U.S. Application Data

[63] Continuation-in-part of Ser. No. 662,388, Mar. 1, 1976, abandoned.

[51] Int. Cl.² .......................... B01J 8/24; B01J 37/14; B01D 15/06
[52] U.S. Cl. ................................. 422/144; 252/417; 422/145; 422/310
[58] Field of Search .......................... 23/288 B, 288 S; 252/417; 208/164

[56] References Cited

U.S. PATENT DOCUMENTS

| | | | |
|---|---|---|---|
| 2,798,030 | 7/1957 | Hettick et al. | 23/288 S X |
| 3,661,800 | 5/1972 | Pfeiffer et al. | 23/288 S X |
| 3,847,793 | 11/1974 | Schwartz et al. | 252/417 X |
| 3,902,990 | 9/1975 | Luckenbach | 23/288 S X |
| 3,904,548 | 9/1975 | Fagan et al. | 23/288 B X |
| 3,938,960 | 2/1976 | Glasgow et al. | 23/288 B |
| 3,974,091 | 8/1976 | Parker et al. | 23/288 B X |

*Primary Examiner*—Joseph Scovronek
*Attorney, Agent, or Firm*—Craig W. Walford; C. W. Crady

[57] ABSTRACT

A catalyst regenerator is disclosed which incorporates a closed vessel having a centered stand pipe concentrically arranged within a spent catalyst distributor. The catalyst is carried upwardly by the distributor and is scattered evenly and concentrically about the distributor. The spent catalyst is deposited on or near the top of the dense phase catalyst bed. A symmetrically arranged, preferably triangular fresh air distributor system including a number of transverse branches having small nozzles mounted thereon forms a grid pattern below the lower portions of the catalyst bed in the regenerator. Air for burning of the coke on the spent catalyst is introduced evenly to minimize the size of the air bubbles in the dense bed. The catalyst in the lower portions of the bed has a minimum of coke remaining thereon. The oxygen of the air which is introduced in the lower portions of the bed is consumed by combustion of the reduced quantity of coke in the lower portions of the bed. As the air flows through the dense bed to the upper surface, the catalyst encountered at the higher levels has more coke on it. However, the air is partly depleted of oxygen which prevents formation of excessive particle temperatures in the dense phase fluid bed. The region of high coke concentration experiences controlled burning achieved by controlled partial oxygen depletion. This tends to burn more of the carbon in the bed, thereby reducing afterburning in the dilute phase above the bed. This provides uniform heating of the catalyst to a higher temperature, thereby reducing the heat required in the feed stock pre-heater. Carbon monoxide disposal equipment is also eliminated by consumption of most of the carbon monoxide within the bed, all without afterburning thereabove.

9 Claims, 3 Drawing Figures

U.S. Patent  Apr. 17, 1979  4,150,090
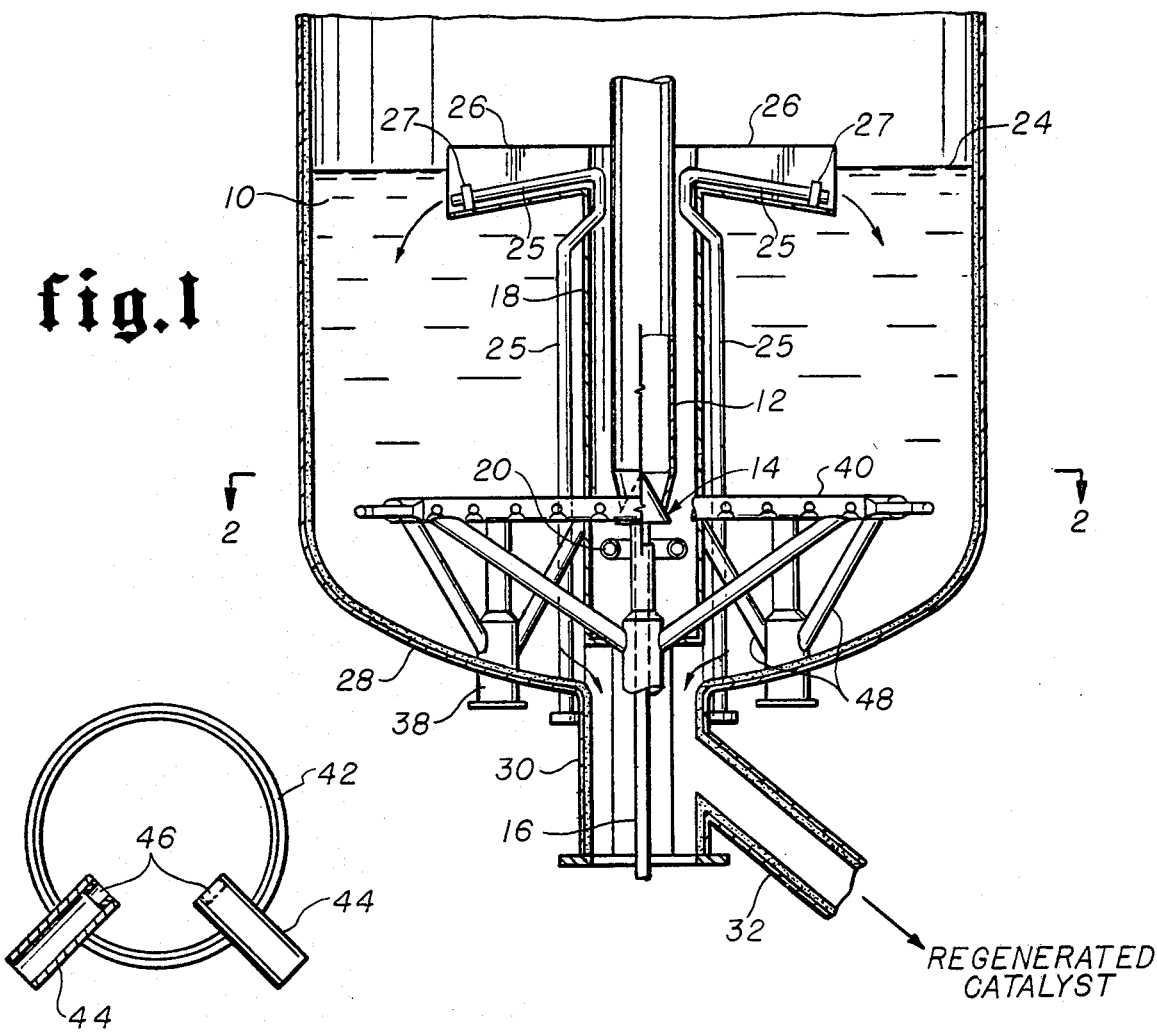
fig.1
fig.3
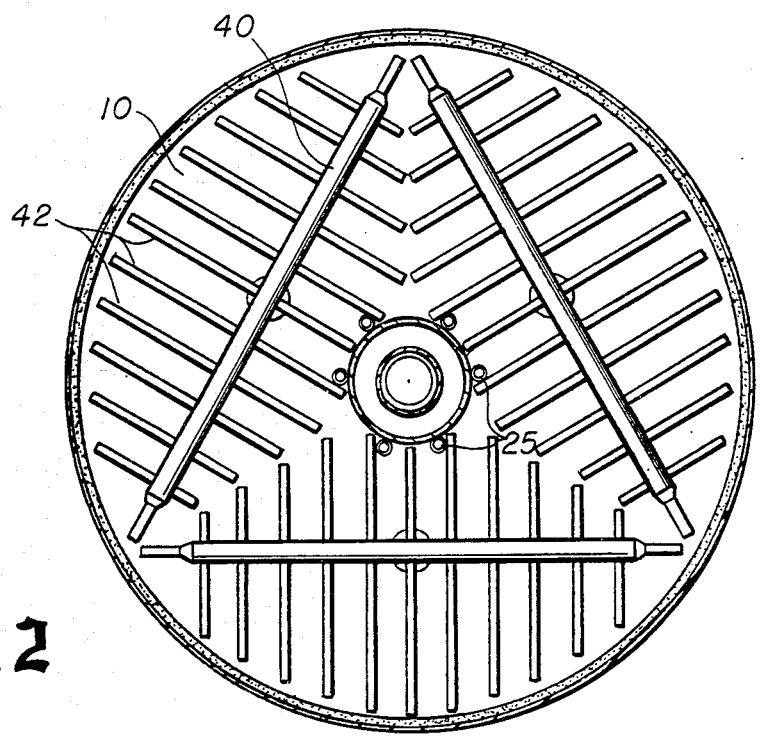
fig.2

APPARATUS FOR REGENERATION OF CRACKING CATALYST

CROSS REFERENCE TO RELATED APPLICATIONS

This application is a continuation-in-part of copending U.S. Patent Application Ser. No. 662,388, filed Mar. 1, 1976, now abandoned.

BACKGROUND OF THE DISCLOSURE

In the regeneration of spent catalyst, the burning of the coke elevates the temperature of the catalyst. Modern zeolite catalysts rapidly lose activity at temperatures of about 1500° F. which imposes a temperature limit on the regenerator. Normally, a regenerator accumulates the particulate catalyst in a fluid bed. While the average temperature through the bed may be below the critical deactivation temperature, it is also necessary that the particle temperature not exceed the temperature level at which deactivation occurs. There can easily occur local, minute hot spots in which some catalyst is deactivated. This is highly undesirable and should be avoided if possible.

The temperature of a particle of catalyst, as opposed to that of the bed as a whole, is a function of the supply of oxygen as indicated by its partial pressure, the availability and concentration of coke and other volatile hydrocarbons which are the fuels consumed by combustion, the degree of mixing of heavily and lightly coked catalyst particles in the catalyst bed and the distribution of coke on the catalyst particles.

The present invention contemplates introduction of newly supplied spent catalyst to a dense phase fluid bed where the freshly introduced catalyst is distributed steadily and evenly over the top side of the catalyst bed. It is distributed and dispersed over or in the upper regions of the bed separated from the place of introduction of air such that a substantial portion of the oxygen has partially been depleted in combustion of coke in the lower regions of the bed. This enables the newly introduced heavily coked particles to achieve initial burning with a controlled increase in temperature at the top of the catalyst bed.

The present invention is directed to a method and apparatus which is able to consume more of the coke during regeneration at the most expedient time, thereby achieving an opportune disposal of the coke without creating hot spots and the consequential catalyst deactivation normally resulting from hot spots. The particles of catalyst in the lower portions of the bed have substantially less coke thereon but are exposed to more oxygen. This also provides a uniform and regionally increased temperature which tends to elevate the temperature of the bed as a whole but reduces the temperature differential occurring between the bed as a whole and the individual particles. The catalyst which is removed from the center lower portions of the bed achieves a higher temperature, thereby reducing the amount of pre-heat required for the feed stock which saves utilities.

Another advance provided by the apparatus is the combustion of the coke in the dense phase fluid bed. The regeneration of spent catalyst involves three main reactions:

$$CO_2 + = = 2CO$$

$$2CO + O_2 = = 2CO_2$$

$$C + O_2 = = CO_2$$

The last equation describes the net effect of the other two oxidation reactions, and is the most desirable. To the extent that any carbon monoxide is liberated, the second equation is desirable. When carbon monoxide is disposed of a flue gas it is, in effect, a wasted fuel but its combustion in the fluid bed can provide the heat necessary to raise the regenerator temperature significantly. However, if the combustion of the carbon monoxide occurs in the upper portions of the regenerator chamber, it will heat the flue gas leaving the regenerator. It is advantageous for it to be combusted in the fluid bed, rather than afterburning above the surface of the bed. The present invention is constructed and arranged so that a substantially high percentage of any carbon monoxide liberated is combusted within the bed to thereby heat the circulating catalyst.

SUMMARY OF THE INVENTION

The present invention is a regenerator apparatus for spent fluid cracking catalyst which incorporates a central stand pipe delivering the spent catalyst downwardly to a plug valve and a surrounding well pipe which opens vertically at the upper end. Several jets of steam from the bottom of the well pipe fluidize the spent catalyst which flows upwardly in the well. At the top of the well pipe, the spent catalyst is carried along radial arms which slope downwardly. The radial arms help distribute the spent catalyst rather evenly over the top of a catalyst bed in the regenerator. Conduits convey a fluid such as steam to each of the radial arms to fluidize the catalyst particles and eject at least a portion of the catalyst at various points along the length of the arms. In this way, even distribution and dispersion of the catalyst over the top of the bed is even further enhanced.

The catalyst bed extends substantially above a transverse air inlet manifold comprising three independent main conduits. The air inlet manifold is comprised of symmetrically located main conduits having a number of lateral branches which support a number of outlet nozzles fairly evenly located across the transverse section of the container.

Fresh air is introduced in the lower portions of the catalyst bed. In these portions the catalyst is exposed to more oxygen but it has a reduced amount of coke thereon. As the air flows in a smooth, continuous phase to the top surface of the bed, the oxygen is partly depleted. The newly introduced catalyst carries a substantial quantity of coke thereon. This is exposed for burning at or near the surface of the bed. Temperatures at the surface are partly controlled by the partially depleted oxygen. These features combine to result in substantial combustion of the coke. It is burned within the fluid bed to raise the average temperature of the bed. This serves to pre-heat the catalyst supplied to the catalytic cracking process, reducing utilities by reducing the heat required for pre-heating the feed stock. The carbon monoxide discharged with the flue gasses is reduced by combusting it in the fluid bed. Its combustion occurs within the fluid bed and not by afterburning, thereby serving as a fuel to controllably increase the fluid bed temperature within the constraints imposed by maximum operating temperatures of the particulate catalyst.

DESCRIPTION OF THE DRAWINGS

FIG. 1 is a sectional view through the regenerator constructed and arranged in accordance with the present invention showing a catalyst distributor system arranged adjacent to a fluid bed having an air inlet manifold arranged therein;

FIG. 2 is a sectional view along the line 2—2 of FIG. 1 disclosing details of construction of the air distributor system located within the fluid bed; and FIG. 3 is a detail view of an air inlet nozzle.

DESCRIPTION OF THE PREFERRED EMBODIMENT

Attention is directed to FIG. 1 where a closed regenerator chamber 10 is constructed of an external metal skin and an internal ceramic as is customary. It is a symmetrical structure arranged about a stand pipe 12. The stand pipe 12 opens downwardly into a tapered plug valve 14. Spent catalyst is introduced to the stand pipe 12 from a stripper (not shown). The flow out of the stand pipe is regulated by the valve 14. The valve 14 moves upwardly and downwardly on a valve stem 16. As it is opened and closed, the flow of catalyst is regulated. The stand pipe 12 is concentrically arranged on the interior of an upright well pipe 18. The well pipe 18 is closed at the bottom. Just below the plug valve 14, a steam injection ring 20 is located. The steam inlet 20 preferably incorporates a number of small openings which jet a flow of steam upwardly in the annular space within the well pipe 18. The well pipe 18 is open at its upper end. The catalyst flows upwardly at relatively low velocities toward the upper end of well pipe 18.

At the upper end of well pipe 18, there are a plurality of circumferentially spaced notches, and, at each notch, a radially extending catalyst distributor arm or trough 26 is mounted. Each of the arms 26 may have a substantially U-shaped cross sectional configuration so that the arm forms a trough for the catalyst from the well pipe. The bottom of the trough slopes downwardly. The arms 26 may be located just above the normal level of the fluid bed and are evenly spaced from one another. In this way, when catalyst from the well pipe 18 flows down the length of the arms 26 and falls to the catalyst bed, the falling of the catalyst involves some dispersion and enhances distribution of spent catalyst over the top bed surface. Alternatively, the arms 26 may extend into the upper regions of the bed. In either arrangement, the arms do not extend fully to the wall of chamber 10, but terminate inwardly therefrom.

At least a portion of the catalyst may not flow along the full length of any one of the arms. In a preferred embodiment of the present invention, the catalyst along the arms is at least partly fluidized and thereby ejected from the arms at various points along the length of the arms. Conduits 25 extend through the shell of chamber 10, upwardly along well pipe 18 and into the arms. A conduit 25 is provided for each radial arm 26, and the portion of the conduit 25 in each arm is supported at its outermost end by a collar 27. Orifices are provided in the upper surface of the portions of the conduits which extend into an arm 26 so that a fluid such as steam may be introduced in the arm 26 and at least partially fluidize catalyst in the arm. As a result of the fluidization, at least part of the catalyst in the arms is expelled at various points along the length of the arms. In this manner, dispersion and even distribution of the catalyst into the bed is enhanced.

The upper end of the chamber 10 includes flue gas removal equipment such as cyclone separators (not shown) which return to the bed any catalyst carried upward by the rising flue gasses.

The regenerator chamber 10 is curved at 28 and extends inwardly to funnel catalyst to an outlet boot 30. The boot 30 is approximately concentric with, but below, the well pipe 18. A circular gap or opening is defined between the two which enables regenerated catalyst to flow into the boot 30. The tapered regenerator surface delivers the regenerated catalyst from all points within the chamber 10 into the boot. The regenerated catalyst accumulates in the boot and flows out through an angled outlet pipe 32. The catalyst is used in a cracking process and subsequently returned to the regenerator.

An air system having selectively operable preheaters (not shown) introduces a steady flow of a specified volume of air through an inlet header 38. The inlet feeds upwardly to a transverse pipe 40 which is better shown in FIG. 2. The pipe 40 connects to a number of smaller laterals 42. The several lateral pipes 42 support a number of small nozzles shown in FIG. 3. The nozzles 44 include small end openings 46.

In the sectional view of FIG. 2, three independent air systems are shown. Each of the three inlet headers 38 is connected to a major conduit. Laterals 42 are duplicated at many locations on each conduit 40. They are evenly spaced along the pipes 40 and extend outwardly toward the shell of the chamber 10 and inwardly until they come close to contact with the center well pipe to otherwise span the entirety of the cross section. The nozzles extend laterally and downwardly. The nozzles preferably include outlets of about one-quarter inch opening at the beginning of a hollow pipe extending between four and five inches. The nozzle (FIG. 3) has an internal passage of about three-fourths inch diameter. The dimensions given are representative and contemplate the use of air delivered in substantial volume adequate for regeneration of the catalyst which is preferably the newer zeolite catalyst, although any cracking catalyst may be used. Additionally, the catalyst may comprise promoters such as, for example, platinum, for carbon monoxide combustion in its formulation, or carbon monoxide combustion promoters may be added to the catalyst inventory. The nozzles 44 deliver a substantially large flow of fresh air into the catalyst bed. Preferably the nozzles 44 are at least partly recessed with a lateral pipes 42 and are set at angles inclined downwardly from the horizontal by about 45°. They inject air into the fluid bed with a minimum risk of entry of catalyst into the nozzle opening 46. Each major conduit may be supplied with independent controlled air flow. Preferably, there is open fluid communication from each header 38 to its associated pipe 40, lateral pipes 42 and nozzles 44; i.e., no valves or other structure is placed in these flow paths which might impede air flow and cause unwanted pressure differentials.

In FIG. 1, the conduit 40 is supported on the header 38 by angled pipes 48 which align the conduit 40 in the horizontal plane. The pipes 48 also serve as auxiliary air supply means by supplying air from the header 38 to the midsections of the conduits 40.

With the present invention, a substantially complete combustion of carbon to carbon dioxide, a reduction of carbon monoxide effluent, and a concentration of combustion in the fluid bed are all achieved. As a result, the particulate catalyst is heated to a higher level, thus reducing the amount of pre-heat which is required for the feed stock supplied to the riser. A reduction of 200°–300° F. is contemplated, depending on the relative proportions of catalyst and feed stock mixed together in the riser. The combustion of the carbon monoxide which heretofore had been a constituent of the flue gas avoids pollution problems. The carbon monoxide, if released, is a pollutant, but it is also a fuel to be consumed within the bed. These results are achieved in the following manner.

The spent catalyst having the coke coated thereon is delivered through the stand pipe and well pipe to the distributor arms 26. An even distribution of the freshly delivered spent catalyst is achieved. It flows through the well pipe and jets of steam in the well pipe and the distributor arms assist in fluidization of the catalyst. This even distribution of the steam fluidized catalyst tends to strip away some of the more volatile hydrocarbons on the spent catalyst. As the spent catalyst is stripped of some of the hydrocarbons, the remaining coke related products thereon are exposed for burning at the top layers of the dense phase fluid bed. However, no hot spots are created because air flowing through the top of the bed is depleted substantially of its oxygen. Partial combustion of the coke is achieved at this juncture. As additional catalyst is distributed on the catalyst bed, the older layers in the catalyst bed move downwardly. As they move downwardly the amount of coke remaining on them is smaller. However, the catalyst is then exposed to a flow of air upwardly through the bed which has more oxygen. More complete burning of the small traces of coke occurs in the lower portions of the bed down to the level of the air inlet means. As a consequence, reactivation occurs, leaving only a very slight trace of coke on the catalyst. The slight trace left approaches 0.05% of the catalyst by weight. This is a highly desirable regeneration action.

One consequence is the burning of carbon on catalyst to a non-pollutant carbon dioxide with a minimum of catalyst inventory and without encountering excessive catalyst particle temperatures which cause de-activation. Excessive catalyst particle temperatures occur when the reactants carbon and oxygen are combined at high concentration and high temperatures (over 1250° F.). Particle temperatures can be 300°–500° F. higher than the bulk temperature of the bed.

The carbon monoxide liberated at any point in the bed is consumed substantially within the bed. Regenerators have ordinarily discharged as much carbon monoxide as carbon dioxide. By contrast, the ratio achieved by this apparatus is measurably better, a ratio of about one to two hundred or more. The combustion of the carbon monoxide within the bed elevates generally the temperature within the fluid bed. However, through the even distribution of the inlet air across the bed, its upward flow in a smooth continuous phase results in an elevated fluid bed temperature with a reduced differential in temperature of individual particles to avoid temperatures exceeding the level at which deactivation occurs. More complete coke combustion occurs with a minimum of damage to the catalyst. The incremental temperature of particles relative to the bed temperature is actually reduced. The combustion of the coke and the heavier hydrocarbons remaining on the newly introduced particles at the surface and the near-surface region also provides controlled temperature elevation, achieved by controlled oxygen depletion, at that portion of the fluid bed without damage to the catalyst. An initial low temperature burn (typically 1150°–1225° F.) is achieved by controlled oxygen concentration and intimate contact with other particles to dissipate heat. The catalyst is exposed to higher temperatures (1250°–1400° F.) to complete the burning but temperatures are limited by low reactant concentration.

The flue gas requires less treatment for removal of pollutants, particularly carbon monoxide. The flue gas does not waste fuel, particularly carbon monoxide. The apparatus functions more economically and enables the withdrawal of higher temperature catalyst from the boot 30. The economies are achieved by reducing catalyst residence time in comparison with those regenerators of the complete combustion designs.

The apparatus can be scaled upwardly or downwardly as desired. It is preferably used in a symmetrical chamber, particularly a substantially cylindrical chamber. The air distributor means shown in FIG. 2 evenly delivers air into the fluid bed for migration upwardly to burn all of the coke evenly within the fluid bed.

The foregoing is directed to the preferred embodiment. The claims which determine the scope follow.

We claim:

1. A spent catalyst regenerator, comprising:
   a vessel having a dense phase fluidized catalyst bed zone therein;
   catalyst distributor means within said vessel for receiving spent catalyst and distributing spent catalyst to the upper portion of the catalyst bed zone, said catalyst distributor means including a plurality of distributor troughs;
   a plurality of fluid conveying conduits having orifices therein and extending into a plurality of said distributor troughs for at least partially fluidizing catalyst in said troughs and expelling at least a portion of the catalyst from said troughs;
   air distributor means extending into said vessel for supplying air to the catalyst bed zone for regenerating spent catalyst; and
   means mounted to said vessel for removing regenerated catalyst from the bottom of the catalyst bed zone.

2. The structure set forth in claim 1, wherein said catalyst distributor means includes:
   a well pipe mounted within said vessel and having an open upper end above the catalyst bed zone;
   catalyst supply means in communication with said well pipe for supplying spent catalyst to said well pipe;
   means mounted within said well pipe for forcing catalyst toward the upper end of said well pipe; and
   wherein said distributor troughs are mounted at the upper end of said well pipe and extend radially therefrom.

3. The structure set forth in claim 1, wherein said air distributor means includes:
   air supply means extending into said vessel for supplying air;
   a plurality of horizontally extending pipes in fluid communication with said air supply means for receiving air therefrom;
   a plurality of branch pipes mounted with each of said horizontal pipes, each of said branch pipes for receiving air therefrom and passing the air into the catalyst bed zone through nozzle means mounted on said branch pipes.

4. The structure set forth in claim 3, wherein:

said horizontal pipes include three pipes in a substantially triangular configuration.

5. The structure set forth in claim 4, wherein:

said air supply means includes three independent air sources, each of which is in fluid communication with a different one of said horizontal pipes.

6. The structure set forth in claim 1, wherein said catalyst distributor means extends substantially along the central vertical axis of the catalyst bed of said vessel.

7. The structure set forth in claim 3, wherein said nozzle means are at least partially recessed in said branch pipes.

8. The structure set forth in claim 3, wherein said nozzle means extend downwardly at an angle with respect to the central vertical axis of the catalyst bed zone.

9. The structure set forth in claim 2, wherein said catalyst supply means includes:

a stand pipe mounted within said vessel for conveying spent catalyst to said well pipe; and means mounted within said vessel for controlling the flow rate of catalyst from said stand pipe.

* * * * *